(12) United States Patent
Meinhardt

(10) Patent No.: US 10,059,200 B1
(45) Date of Patent: Aug. 28, 2018

(54) MAGNETICALLY STABILIZED PROPSHAFT BEARING SYSTEM

(71) Applicant: GM GLOBAL TECHNOLOGY OPERATIONS LLC, Detroit, MI (US)

(72) Inventor: Glenn Meinhardt, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/449,455

(22) Filed: Mar. 3, 2017

(51) Int. Cl.
*B60K 17/24* (2006.01)
*F16C 32/04* (2006.01)
*H01F 7/06* (2006.01)

(52) U.S. Cl.
CPC ............ *B60K 17/24* (2013.01); *F16C 32/048* (2013.01); *F16C 32/0442* (2013.01); *F16C 32/0446* (2013.01); *F16C 32/0451* (2013.01); *H01F 7/064* (2013.01); *B60Y 2400/48* (2013.01); *F16C 2233/00* (2013.01); *F16C 2326/06* (2013.01)

(58) Field of Classification Search
USPC ................................ 180/376, 781, 382, 838
See application file for complete search history.

(56) References Cited

U.S. PATENT DOCUMENTS

| | | | | |
|---|---|---|---|---|
| 6,487,925 B2* | 12/2002 | Fischer | ................... | C23G 3/023 74/337 |
| 6,729,455 B2* | 5/2004 | Hirota | .................... | B60K 17/02 180/381 |
| 6,811,455 B2* | 11/2004 | Rodriguez | .............. | F16F 15/02 180/376 |
| 6,883,967 B2* | 4/2005 | Robb | ..................... | F16C 35/077 267/140.12 |
| 6,960,024 B2* | 11/2005 | Robb | ..................... | B60K 17/24 267/153 |
| 7,211,020 B2* | 5/2007 | Gohl | ........................ | F16H 48/08 475/231 |
| 7,263,904 B2* | 9/2007 | Yoshida | .................. | G01L 3/102 73/862.331 |
| 8,646,566 B1* | 2/2014 | Bouzit | ................... | B60K 17/24 180/376 |
| 2004/0025600 A1* | 2/2004 | Viola | ..................... | H01F 13/003 73/862.335 |
| 2010/0200325 A1* | 8/2010 | Marsh | ..................... | G01L 3/102 180/383 |

* cited by examiner

*Primary Examiner* — Toan To
(74) *Attorney, Agent, or Firm* — Cantor Colburn LLP

(57) ABSTRACT

A magnetically stabilized propshaft bearing system includes a bracket having a bearing receiving zone, an isolator arranged in the bearing receiving zone, and a propshaft bearing arranged in the bearing receiving zone and supported by the isolator. The propshaft bearing is receptive to rotatably support a propshaft for a vehicle. An electromagnet is mounted in the bracket surrounding a portion of the bearing. The electromagnet is selectively activated to shift the propshaft bearing within the bearing receiving zone.

20 Claims, 2 Drawing Sheets

MAGNETICALLY STABILIZED PROPSHAFT BEARING SYSTEM

INTRODUCTION

The subject invention relates to the art of motor vehicles and, more particularly, to a magnetically stabilized propshaft bearing system for a vehicle.

Certain vehicles may include a drive or propshaft formed from multiple components. Typically, a multi-piece propshaft will include a support arranged between a first end of the multi-piece propshaft and a second end of the multi-piece propshaft. Generally, the support is arranged centrally along the multi-piece propshaft. The support may include a bearing arranged in a resilient bushing. The bearing supports rotational forces on the propshaft while the resilient bushing accommodates radial forces. At certain speeds undesirable vibrations may develop due to resiliency inherent to the bushing. Accordingly, it is desirable to provide support for a multi-piece propshaft that can resist vibrations.

SUMMARY

In accordance with an aspect of an exemplary embodiment, a magnetically stabilized propshaft bearing system includes a bracket having a bearing receiving zone, an isolator arranged in the bearing receiving zone, and a propshaft bearing arranged in the bearing receiving zone and supported by the isolator. The propshaft bearing is receptive to rotatably support a propshaft for a vehicle. An electromagnet is mounted in the bracket surrounding a portion of the bearing. The electromagnet is selectively activated to shift the propshaft bearing within the bearing receiving zone.

In addition to one or more of the features described above or below, or as an alternative, further embodiments could include a bearing stabilization control module operatively connected to the electromagnet, the bearing stabilization control module selectively activating the electromagnet based on a vehicle condition.

In addition to one or more of the features described above or below, or as an alternative, further embodiments could include a vehicle speed sensor operatively connected to the bearing stabilization control module, wherein vehicle condition comprises vehicle speed.

In addition to one or more of the features described above or below, or as an alternative, further embodiments could include a vibration sensor operatively connected to the bearing stabilization control module, wherein the vehicle condition comprises undesirable vibrations.

In addition to one or more of the features described above or below, or as an alternative, further embodiments could include wherein the undesirable vibrations comprise undesirable propshaft vibrations.

In addition to one or more of the features described above or below, or as an alternative, further embodiments could include wherein the vibration sensor is mounted to the bracket.

In accordance with another aspect of an exemplary embodiment, a vehicle includes a frame, a body supported by the frame, and a powertrain coupled to the frame. The powertrain includes a prime mover, a transmission, a differential, and a propshaft operatively connecting the transmission and the differential. A magnetically stabilized propshaft bearing system is coupled to the propshaft. The magnetically stabilized bearing system includes a bracket having a bearing receiving zone, an isolator arranged in the bearing receiving zone, and a propshaft bearing arranged in the bearing receiving zone and supported by the isolator. The propshaft bearing is receptive to rotatably support a propshaft for a vehicle. An electromagnet is mounted in the bracket surrounding a portion of the bearing. The electromagnet is selectively activated to shift the propshaft bearing within the bearing receiving zone.

In addition to one or more of the features described above or below, or as an alternative, further embodiments could include a bearing stabilization control module operatively connected to the electromagnet, the bearing stabilization control module selectively activating the electromagnet based on a vehicle condition.

In addition to one or more of the features described above or below, or as an alternative, further embodiments could include a vehicle speed sensor operatively connected to the bearing stabilization control module, wherein vehicle condition comprises vehicle speed.

In addition to one or more of the features described above or below, or as an alternative, further embodiments could include a vibration sensor operatively connected to the bearing stabilization control module, wherein the vehicle condition comprises undesirable vibrations.

In addition to one or more of the features described above or below, or as an alternative, further embodiments could include wherein the undesirable vibrations comprise undesirable propshaft vibrations.

In addition to one or more of the features described above or below, or as an alternative, further embodiments could include wherein the vibration sensor is mounted to the bracket.

In addition to one or more of the features described above or below, or as an alternative, further embodiments could include wherein the propshaft comprises a multi-piece propshaft including a first propshaft member and a second propshaft member operatively connected at a joint.

In addition to one or more of the features described above or below, or as an alternative, further embodiments could include wherein the magnetically stabilized propshaft baring system is arranged adjacent to the joint.

In accordance with yet another aspect of an exemplary embodiment, a method of stabilizing a propshaft bearing includes detecting a vehicle condition that affects a position of a propshaft bearing in a bracket, activating an electromagnet that surrounds a portion of the propshaft bearing based on the vehicle condition, and shifting the propshaft bearing to a predetermined position in a bearing receiving zone of the bracket.

In addition to one or more of the features described above or below, or as an alternative, further embodiments could include wherein shifting the bearing to the predetermined position includes substantially centering the propshaft bearing within the bearing receiving zone.

In addition to one or more of the features described above or below, or as an alternative, further embodiments could include wherein detecting the vehicle condition includes detecting vehicle speed.

In addition to one or more of the features described above or below, or as an alternative, further embodiments could include wherein activating the electromagnet based on the vehicle condition includes activating the electromagnet when the vehicle speed is within in a predetermined speed range.

In addition to one or more of the features described above or below, or as an alternative, further embodiments could include wherein detecting the vehicle condition includes detecting undesirable propshaft vibrations.

In addition to one or more of the features described above or below, or as an alternative, further embodiments could include wherein activating the electromagnet based on the vehicle condition includes activating the electromagnet upon sensing undesirable propshaft vibrations over a predetermined vibration threshold.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
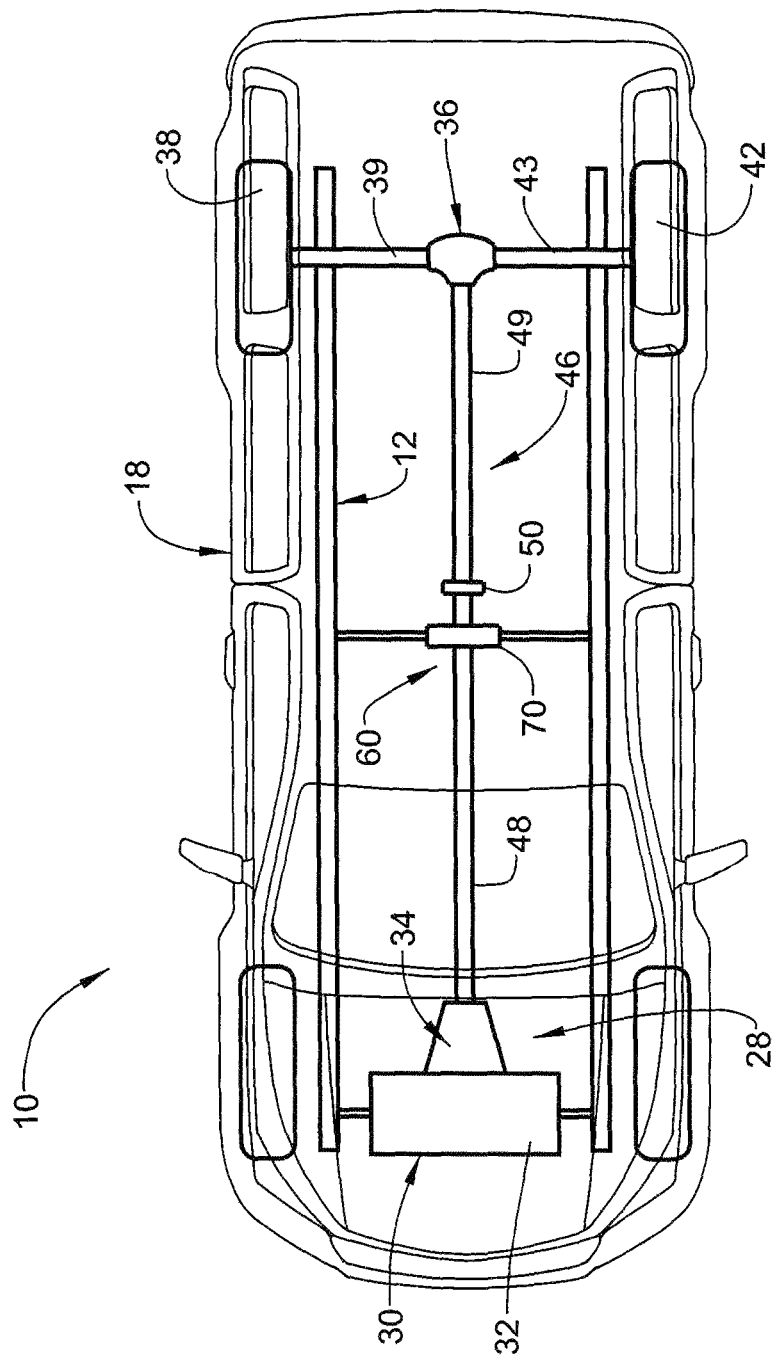
FIG. 1 depicts a vehicle including a magnetically stabilized propshaft bearing system, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features. As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

A vehicle, in accordance with an exemplary embodiment, is indicated generally at 10 in FIG. 1. Vehicle 10 includes a frame 12 that supports a body 18 and a powertrain 28. Powertrain 28 includes a prime mover 30, which may take the form of a motor 32. Motor 32 may take the form of an internal combustion engine, an electric motor, a hybrid motor, or the like. Motor 32 is coupled to a transmission 34 which, in turn, is operatively connected to a differential 36. Differential 36 is operatively connected to a first wheel 38 through a first axle 39 and to a second wheel 42 through a second axle 43. Transmission 34 is connected to differential 36 through a propshaft 46. In the exemplary aspect shown, propshaft 46 takes the form of a multi-piece propshaft having a first propshaft member 48 connected to a second propshaft member 49 at a joint 50.

Figure 2:
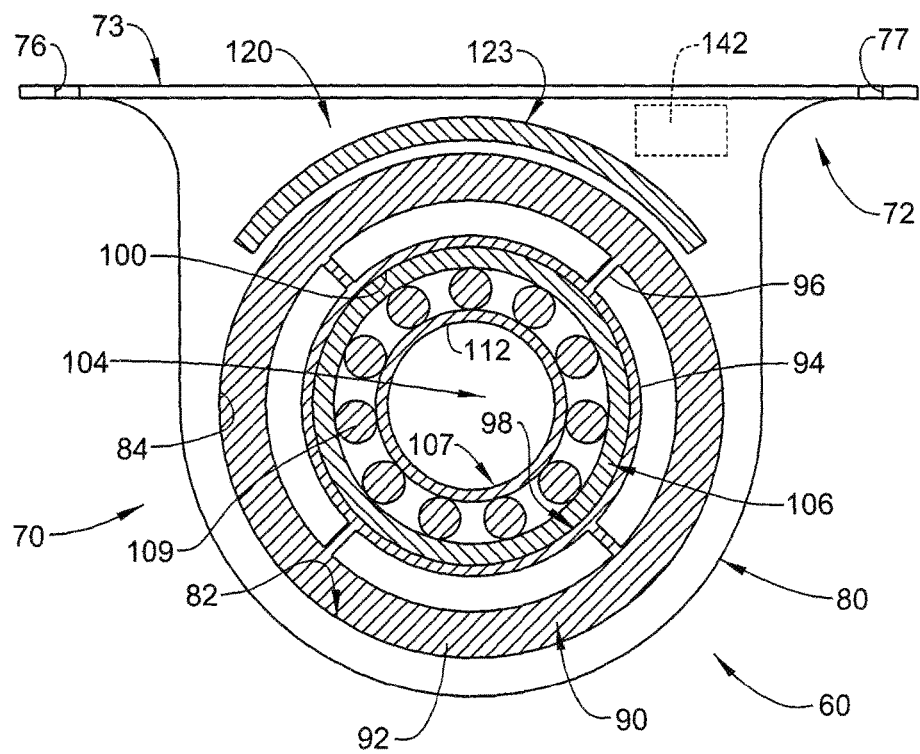
FIG. 2 is a schematic illustration of the magnetically stabilized propshaft bearing system, in accordance with an aspect of an exemplary embodiment.

In accordance with an aspect of an exemplary embodiment, propshaft 46 is mechanically supported to frame 12 through a magnetically stabilized propshaft bearing system 60 that may be arranged adjacent to joint 50. Referring to FIG. 2, magnetically stabilized propshaft bearing system 60 includes a bracket 70 that may be secured to a cross member (not separately labeled) of frame 12. Bracket 70 includes a base portion 72 provided with a flange 73 having a first passage 76 and a second passage 77. First and second passages 76 and 77 may be receptive to mechanical fasteners (not shown) that link bracket 70 to frame 12.

In further accordance with an exemplary aspect, bracket 70 includes a bearing support portion 80 defining a bearing receiving zone 82 including an inner annular surface 84. An isolator 90 is arranged in bearing receiving zone 82. Isolator 90 may be formed from an elastomeric or flexible material and includes an outer portion 92 supported at inner annular surface 84 and an inner portion 94. Inner portion 94 is joined to outer portion 92 through a number of web members, one of which is indicated at 96. It is to be understood that the number, arrangement and location of web members 96 may vary. Inner portion 94 includes an opening 98 having an annular surface section 100. A bearing 104 is arranged in opening 98. Bearing 104 includes an outer race 106 supported by annular surface section 100, an inner race 107 and a plurality of bearing elements 109 arranged therebetween. Inner race 107 includes a passage 112 that may be receptive to, and rotatably support, propshaft 46.

Figure 3:
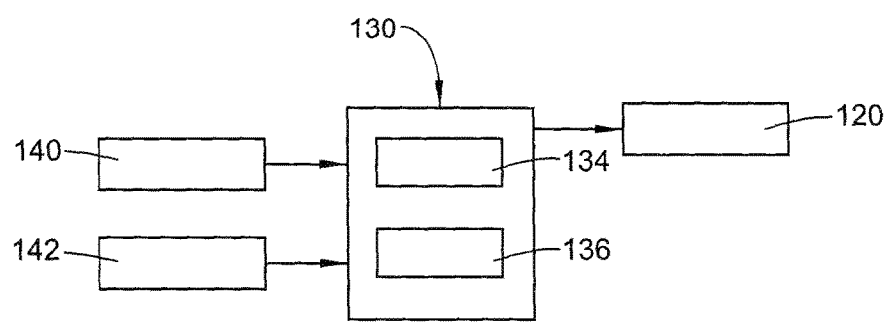
FIG. 3 is a block diagram depicting the magnetically stabilized propshaft bearing system, in accordance with an aspect of an exemplary embodiment.

In accordance with an aspect of an exemplary embodiment, bracket 70 supports an electromagnet 120 including a body 123 that at least partially surrounds bearing 104. In accordance with an exemplary aspect, electromagnet 120 is arranged on a side of bearing 104 opposite a direction of gravity. However, it is to be understood that the particular location, shape, and size of electromagnet 120 may vary. Referring to FIG. 3, electromagnet 120 is electrically connected to a bearing stabilization control module 130, which may include a processor 134 and a memory 136. Bearing stabilization control module 130 may also be electrically connected to a vehicle speed sensor 140 and a propshaft vibration sensor 142. Bearing stabilization control module 130 selectively activates electromagnet 120 based on sensed vehicle conditions to avoid undesirable vibrations of propshaft 46. Upon activation, electromagnet 120 draws bearing 104 to a predetermined position within bearing receiving zone 82 to prevent and/or correct misalignments of propshaft 46 that may lead to vibrations.

In accordance with an aspect of an exemplary embodiment, electromagnet 120 may shift bearing 104 to be substantially centrally positioned within bearing receiving zone 82. It is to be understood that electromagnet 120 may shift bearing 104 to an off-center, yet stabilized position within bearing receiving zone 82. An off-center position may be desirable in order to apply a load to, or relieve a load from portions of isolator 90 and/or adjust stiffness parameters and vibration properties of bearing 104.

In accordance with an aspect of an exemplary embodiment, bearing stabilization control module 130 receives input from vehicle speed sensor 140 regarding vehicle speed. Upon detecting that vehicle 10 has achieved a predetermined speed, bearing stabilization control module 130 activates electromagnet 120. For example, a predetermined speed range may be stored in memory 136. The predetermined speed range may represent a vehicle speed associated with propshaft vibration. Bearing stabilization control module 130 may operate in a proactive mode and maintain electromagnet 120 in a state of activation for as long as vehicle 10 is traveling at a speed that falls within the predetermined speed range. Further, bearing stabilization control module 130 may activate electromagnet 120 just prior to a vehicle entering the predetermined speed range and maintain a state of activation for a short period after vehicle 10 exits the predetermined speed range.

In addition to being proactive, e.g., activating electromagnet 120 as vehicle 10 enters a predetermined speed range, bearing stabilization control module 130 may also be reactive and activate electromagnet 120 upon detecting undesirable vibrations through propshaft vibration sensor 142. Undesirable vibrations may comprise undesirable propshaft vibrations that exceed a predetermined vibration threshold. In either mode, bearing stabilization control module 130 maintains a substantially centered position of bearing 104 during selected modes of vehicle operation in order to reduce vibration and prolong component life.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A magnetically stabilized propshaft bearing system comprising:
    a bracket including a bearing receiving zone;
    an isolator arranged in the bearing receiving zone;
    a propshaft bearing arranged in the bearing receiving zone and supported by the isolator, the propshaft bearing being receptive to rotatably support a propshaft for a vehicle; and
    an electromagnet mounted in the bracket surrounding a portion of the bearing, the electromagnet being selectively activated to shift the propshaft bearing within the bearing receiving zone.

2. The magnetically stabilized propshaft bearing system according to claim 1, further comprising: a bearing stabilization control module operatively connected to the electromagnet, the bearing stabilization control module selectively activating the electromagnet based on a vehicle condition.

3. The magnetically stabilized propshaft bearing system according to claim 2, further comprising: a vehicle speed sensor operatively connected to the bearing stabilization control module, wherein vehicle condition comprises vehicle speed.

4. The magnetically stabilized propshaft bearing system according to claim 2, further comprising: a vibration sensor operatively connected to the bearing stabilization control module, wherein the vehicle condition comprises undesirable vibrations.

5. The magnetically stabilized propshaft bearing system according to claim 4, wherein the undesirable vibrations comprise undesirable propshaft vibrations.

6. The magnetically stabilized propshaft bearing system according to claim 5, wherein the vibration sensor is mounted to the bracket.

7. A vehicle comprising:
    a frame;
    a body supported by the frame;
    a powertrain coupled to the frame, the powertrain including a prime mover, a transmission, a differential, and a propshaft operatively connecting the transmission and the differential; and
    a magnetically stabilized propshaft bearing system operatively connected to the propshaft, the magnetically stabilized propshaft bearing system comprising:
    a bracket including a bearing receiving zone;
    an isolator arranged in the bearing receiving zone;
    a propshaft bearing arranged in the bearing receiving zone and supported by the isolator, the propshaft bearing being receptive to rotatably support the propshaft for the vehicle; and
    an electromagnet mounted in the bracket surrounding a portion of the bearing, the electromagnet being selectively activated to shift the propshaft bearing within the bearing receiving zone.

8. The vehicle according to claim 7, further comprising: a bearing stabilization control module operatively connected to the electromagnet, the bearing stabilization control module selectively activating the electromagnet based on a vehicle condition.

9. The vehicle according to claim 8, further comprising: a vehicle speed sensor operatively connected to the bearing stabilization control module, wherein vehicle condition comprises vehicle speed.

10. The vehicle according to claim 8, further comprising: a vibration sensor operatively connected to the bearing stabilization control module, wherein the vehicle condition comprises undesirable vibrations.

11. The vehicle according to claim 10, wherein the undesirable vibrations comprise undesirable propshaft vibrations.

12. The vehicle according to claim 11, wherein the vibration sensor is mounted to the bracket.

13. The vehicle according to claim 7, wherein the propshaft comprises a multi-piece propshaft including a first propshaft member and a second propshaft member operatively connected at a joint.

14. The vehicle according to claim 13, wherein the magnetically stabilized propshaft bearing system is arranged adjacent to the joint.

15. A method of stabilizing a propshaft bearing comprising:
    detecting a vehicle condition that affects a position of a propshaft bearing in a bracket;
    activating an electromagnet that surrounds a portion of the propshaft bearing based on the vehicle condition; and
    shifting the bearing to a predetermined position within a bearing receiving zone of the bracket.

16. The method of claim 15, wherein shifting the bearing to the predetermined position includes substantially centering the propshaft bearing within the bearing receiving zone.

17. The method of claim 15, wherein detecting the vehicle condition includes detecting vehicle speed.

18. The method of claim 17, wherein activating the electromagnet based on the vehicle condition includes activating the electromagnet when the vehicle speed is within in a predetermined speed range.

19. The method of claim 15, wherein detecting the vehicle condition includes detecting undesirable propshaft vibrations.

20. The method of claim 19, wherein activating the electromagnet based on the vehicle condition includes activating the electromagnet upon sensing undesirable propshaft vibrations over a predetermined vibration threshold.

* * * * *